United States Patent [19]

Townsend et al.

[11] Patent Number: 5,173,918
[45] Date of Patent: Dec. 22, 1992

[54] HIGH POWER LASER HAVING STAGED LASER ADJOINT PULSED FEEDBACK

[75] Inventors: Sallie S. Townsend, Manchester; Philip R. Cunningham, Bolton; John S. Foley, Manchester, all of Conn.

[73] Assignee: United Technologies Corporation, Hartford, Conn.

[21] Appl. No.: 780,897

[22] Filed: Oct. 23, 1991

[51] Int. Cl.$^5$ ............................................. H01S 3/08
[52] U.S. Cl. ........................................ 372/95; 372/97; 372/99; 372/92; 372/18; 372/26; 372/55
[58] Field of Search .................... 372/18, 19, 20, 21, 372/25, 26, 34, 92, 93, 94, 95, 96, 97, 98, 99, 55

[56] References Cited

U.S. PATENT DOCUMENTS

| | | | |
|---|---|---|---|
| 3,969,687 | 7/1976 | Freiberg et al. | 372/95 X |
| 4,025,172 | 5/1977 | Freiberg | 372/95 X |
| 4,079,340 | 3/1978 | Weiner et al. | 372/95 X |
| 4,123,150 | 10/1978 | Sziklas | 372/95 X |
| 4,164,366 | 8/1979 | Sziklas et al. | 372/95 |
| 4,429,400 | 1/1984 | Kaye | 372/95 |
| 4,446,559 | 5/1984 | von Bieren | 372/95 |
| 4,682,339 | 7/1987 | Sziklas et al. | 372/95 |
| 4,766,393 | 8/1988 | Johnson | 372/95 X |
| 4,841,541 | 6/1989 | Sziklas et al. | 372/95 X |

Primary Examiner—Brian Healy
Attorney, Agent, or Firm—McCormick, Paulding & Huber

[57] ABSTRACT

A laser with an unstable resonator configuration is described with a second, lower power auxiliary laser to provide a feedback beam to pulse high power CW lasers without exceeding the power handling capability limitation of currently available modulators. The present laser relies on adjoint mode feedback provided by the auxiliary laser to accomplish pulsed operation with a modulator in the low power feedback beam path. Higher power output beams can be generated with multiple stages of auxiliary laser providing adjoint mode feedback, thereby reducing incident power on modulation devices while providing adequate adjoint beam power to effectively pulse the high power laser. In certain embodiments a single gain generator is used to drive the main and auxiliary lasers.

53 Claims, 5 Drawing Sheets

HIGH POWER LASER HAVING STAGED LASER ADJOINT PULSED FEEDBACK

TECHNICAL FIELD

The present invention relates generally towards lasers and more particularly towards Q-switched or modulated high powered lasers having an adjoint feedback beam.

CROSS REFERENCE TO RELATED APPLICATIONS

Some of the subject matter hereof is disclosed and claimed in the following commonly owned, copending U.S. patent applications which are incorporated herein by reference: "A High Powered Laser With Reduced Optical Aberration," application Ser. No. 781,771, pending; "Optically Pulsed Laser Having Coupled Adjoint Beams," application Ser. No. 780,637, pending, "A Modelocked High Power Laser Having An Adjoint Feedback Beam," application Ser. No. 780,898, pending; "Pulsed Ring Lasers Using Adjoint Coupling Control," application Ser. No. 781,431, pending; "Optically Pulsed Laser," application Ser. No. 781,430, pending; "Linear Polarization Control of High Power Lasers," application Ser. No. 781,426, pending; "Improved Linear Polarization Control of High Power Lasers," application Ser. No. 781,427, pending; and "Circular and Elliptical Polarization of a High Power Laser by Adjoint Feedback," application Ser. No. 781,428, pending.

BACKGROUND OF THE INVENTION

High powered lasers used for welding or drilling are well known in the art. Typically, these lasers, such as the 14 kilowatt model laser marketed by the Industrial Laser Division of United Technologies Corporation, are of the transverse electrode, convective flow type. In these lasers, large volumes of carbon dioxide gas or an equivalent gaseous lasing medium are flowed through a region of opposed electrodes. A gas discharge is created between the electrodes, creating the population inversion that is needed to generate a high powered, coherent laser beam.

Pulsing of high power industrial lasers has a number of potential applications, such as the potential for suppression of the plasma which forms on a metal target also may give improved welding, hole drilling, and cutting performance. Also, the higher peak power which is potentially achievable with pulsed operation may allow welding and cutting of metals which are now difficult, such as aluminum and copper. Other applications include the stripping of paint from metals. A technique for Q-switching using adjoint feedback beam with an unstable resonator is disclosed and claimed in the copending, commonly owned U.S. patent application entitled "Optically Pulsed Laser," application Ser. No. 781,430, pending, filed on even date and incorporated herein by reference.

Adjoint feedback has been found to be a way of controlling the operation of a laser. Adjoint feedback consists of taking a portion of the output of a laser and retroreflecting it back into the adjoint mode (the converging wave) of the resonator or, in the case of coupling, injecting it into the adjoint mode of another laser. The adjoint feedback beam will propagate to the optic axis after multiple wound trips through the resonator. The advantage of using an adjoint feedback beam is that it is a small low power beam which is not part of the main resonator. Optics in the adjoint feedback beam can be readily changed or rotated.

It would be advantageous to have a high powered laser of the aforementioned type characterized b adjoint feedback that is capable of very high power operation. Currently available modulators have a power handling capability limitation in high power pulsed applications if the modulator is placed directly in the optical train of a high powered laser. The present invention is drawn towards such a laser.

SUMMARY OF THE INVENTION

An object of the present invention is to provide a very high power laser having an adjoint beam feedback generated by an auxiliary laser.

According to the present invention, a laser includes a primary optical cavity disposed along an optic axis having therein a primary optical beam. The optical cavity further has optical losses. A primary excitation apparatus is included for communicating excitation signals to the optical cavity. A primary gain medium is located in the optical cavity for receiving the excitation signals and for providing optical gain to the optical beam such that at least one optical mode exceeds lasing threshold. A primary resonator assembly is positioned within the primary optical cavity and includes a primary cavity first mirror positioned at a first end of the optical cavity; a primary scraper mirror positioned within the primary optical cavity to receive the primary optical beam transiting therein and to turn a portion of the primary optical beam outward from said primary optical cavity as an output beam. The primary scraper mirror has a central aperture along the optic axis and a feedback aperture displaced from the optic axis about a primary feedback axis. A primary cavity second mirror is opposed to the primary cavity first mirror at a second end of the primary optical cavity along the primary optic axis registered with the central aperture and configured to reflect the primary optical beam within the primary optical cavity. Also included is an auxiliary laser for providing along the primary feedback axis an adjoint feedback beam to the primary optical cavity. The auxiliary laser has an auxiliary optical cavity disposed along an auxiliary optic axis and has therein an auxiliary optical beam with the same frequency as the primary optical beam. The auxiliary optical cavity further has optical losses. An auxiliary excitation apparatus is included for communicating excitation signals to the auxiliary optical cavity. A gain medium is located in the auxiliary optical cavity for receiving the excitation signals and for providing optical gain to the auxiliary optical beam such that at least one optical mode exceeds lasing threshold. An auxiliary resonator assembly is positioned within the auxiliary optical cavity and includes an auxiliary cavity first mirror positioned at a first end of the auxiliary optical cavity, an auxiliary scraper mirror positioned within the auxiliary optical cavity to receive the auxiliary optical beam transiting therein and to turn a portion of the auxiliary optical beam outward from the auxiliary optical cavity along the primary feedback axis as the adjoint feedback beam. The auxiliary scraper mirror has a central aperture along the auxiliary optic axis and a feedback aperture displaced from the auxiliary optic axis about an auxiliary feedback axis. An auxiliary cavity second mirror is opposed to the first auxiliary cavity mirror at a second end of the auxiliary optical cavity along the auxiliary optic axis registered with the central aperture and configured to reflect the auxiliary optical beam within the auxiliary optical cavity. A feedback mirror is located along the auxiliary feedback axis for reflecting a feedback beam transiting in the auxiliary optical cavity. A pulsing means is also included and is positioned along the auxiliary feedback axis to receive the auxiliary feedback beam and, in response to control signals, provide thereto a perturbation in optical loss incurred by the auxiliary feedback beam transiting the auxiliary optical cavity, thereby generating a pulsed output beam from the laser.

DESCRIPTION OF THE PREFERRED EMBODIMENT

Advantages for material processing with pulsed lasers relative to continuous wave (CW) operation stem from the peak power intensities obtained during the pulse and the ability to turn the laser off between pulses. The peak intensity increases the laser penetration capability at a given average power resulting in higher processing speeds and lower heat input for a given penetration requirement. The ability to turn the laser off between pulses can be used to reduce or eliminate the plasma formed over the workpiece.

In the past, attempts to generate a pulsed output beam by Q-switching or modelocking required the insertion of an apparatus 26 into the resonator assembly to intercept the optical beam within the assembly to selectively control cavity loss. For modelocked lasers, a passive modelocker can be inserted in the optical cavity such as a standing wave modulator in a material (i.e. germanium) or a saturable absorber such as silicon hexafluoride (SF6). Unfortunately, for high power applications the simple insertion of a modulator or modelocker into the main resonator assembly is unacceptable because of the high flux that will be seen by that element. Consequently, prior art devices have an inherent upper bound to their output power.

Figure 1:
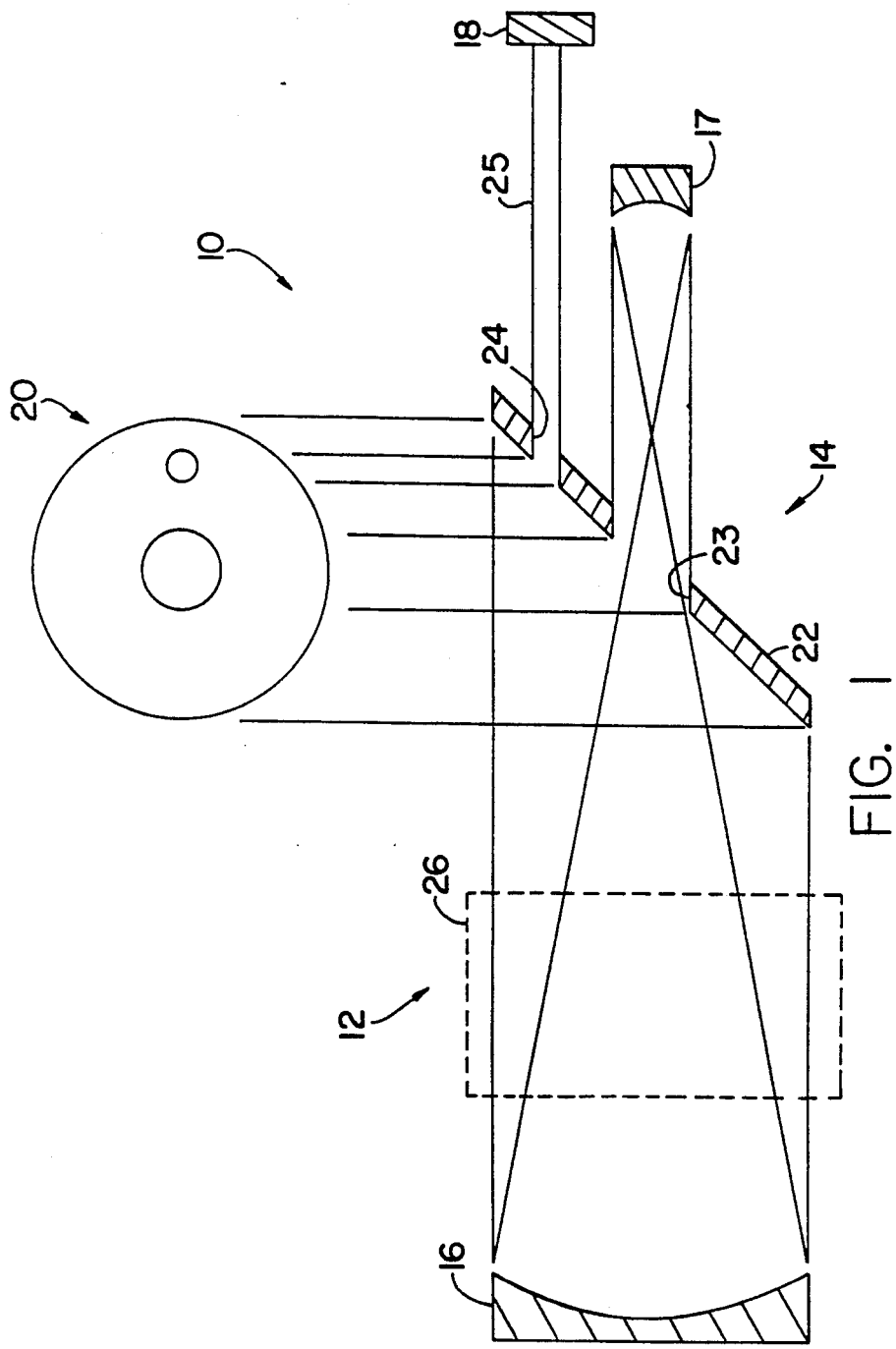
FIG. 1 is a simplified schematic illustration a laser having an adjoint feedback beam.

FIG. 1 is a simplified illustration showing a laser having an external (adjoint) feedback beam. The laser 10 is comprised of a resonator assembly 12 that bounds an optical cavity 14. The resonator assembly includes primary cavity mirrors 16 and 17 as well as feedback mirror 18. A collimated output beam 20 is presented from the laser by a scraper mirror 22. The scraper mirror has a central aperture 23 allowing the optical beam to transit between the cavity mirrors and a second aperture 24 displaced from the central aperture to allow a feedback beam 25 to communicate with the optical beam in the cavity. The resonator assembly shown in laser 10 is of the negative branch, unstable confocal resonator type.

The external feedback beam is reflected back to the primary resonator assembly such that it is mode matched to the adjoint mode of the resonator. A definition of "adjoint mode" is given in "Orthogonality Properties of Optical Resonator Eigenmodes", Optics Comm., Vol. 31, pp. 369–373, Dec. 1979. The axis of the reflected radiation walks into the axis of the resonator during multiple round trip propagations through the resonator. This results in a reduction of the resonator loss more than by any other means of injecting the feedback beam, thus allowing a low power beam to have a large effect.

The output beam is collimated so it is only necessary to retroreflect a portion of the output beam (the feedback beam) with a flat mirror. For non-collimated output, a curved mirror will be necessary to mode match the feedback beam to the adjoint mode of the resonator. A resonator 12 with a feedback beam (adjoint beam 25) has substantially decreased cavity loss and, therefore, has substantially increased circulating power for these operating conditions. If the resonator 12 without the feedback beam 25 is designed so that it is near threshold, it will lase weakly or not lase at all. With the feedback beam present, the laser is above threshold, and will strongly lase due to decreased cavity losses. Placement of a Q-switch or modelocker in the feedback beam path can cause the laser to pulse i.e., operate above and near threshold with the feedback beam injected and not injected into the primary resonator, respectively.

Current damage thresholds for electro-optic or acousto-optic modulators, needed to modulate the adjoint feedback beam, are about 100 W of incident power. For higher power laser applications this is a limitation. As an example, for a 10 kW $CO_2$ laser, the modulated adjoint feedback beam power required for pulsing would be is approximately 2–5% or 200–500 W with the modulator seeing twice this power (two pass). Thus, currently available modulators have a power handling capability limitation in high power pulsed laser applications when the modulator is placed directly in the feedback beam optical train.

Figure 2:
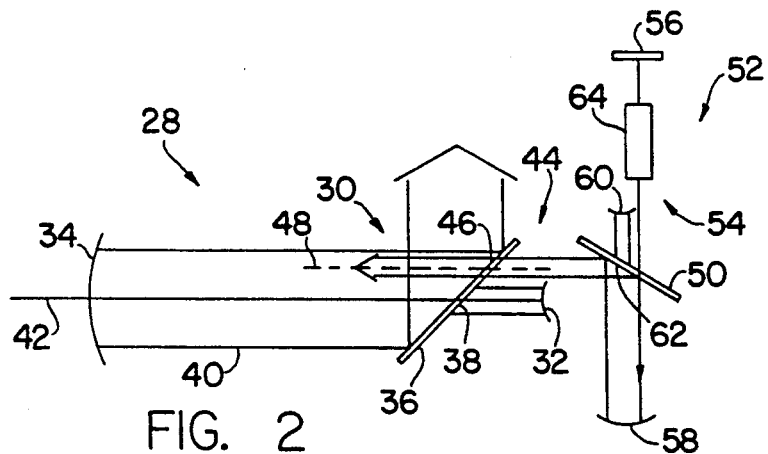
FIG. 2 is a simplified illustration of a laser provided by the present invention.

Referring now to FIG. 2 there is shown a high powered laser 28 provided in accordance with the present invention. The laser is characterized by an external feedback beam (adjoint beam) and displays modulated, pulsed or modelocked operation. The laser employs a confocal unstable primary resonator assembly 30 of the positive branch type. The resonator assembly is comprised of cavity mirrors 34 and 3 whose foci substantially coincide outside of the cavity. Those skilled in the art will note that other resonator assembly geometries, such as a negative branch confocal unstable resonator, positive and negative branch ring resonator and stable resonator assemblies may be equivalently substituted. The laser 28 also includes a scraper mirror 36 having a central aperture 38 for passing a cavity beam 40 between the cavity mirrors along an optic axis 42. The laser 28 is characterized by a feedback beam 44 passed through feedback aperture 46 along a feedback axis 48 to an adjoint feedback scraper mirror 50.

The laser 28 overcomes the power handling difficulty of a modulator in the external adjoint feedback beam of a high power laser. The laser 28 further comprises an auxiliary laser 52 of a confocal unstable design having an auxiliary resonator assembly 54 of the positive branch type. The auxiliary resonator assembly is comprised of auxiliary cavity mirrors 56 and 58 whose foci substantially coincide outside of the cavity. Those skilled in the art will note that other resonator assembly geometries, such as a negative branch confocal unstable resonator assembly may be equivalently substituted.

The gain medium (not shown) in the primary optical cavity used with the laser 28 is typically a gas, such as a known mixture of carbon dioxide, nitrogen and helium. Those skilled in the art will recognize that other gaseous gain media can be equivalently substituted and a variety of electrode configurations can be used depending upon the power output and other desired laser parameters. The laser 28 can operate continuously (CW) in a known manner. A description of known components, such as the electrodes for gas excitation, have been omitted for purposes of clarity. For high power gas lasers, large volumes of gas (i.e. a mixture of carbon dioxide, helium and nitrogen) are flowed at very high velocities (approximately 0.3 Mach) through the laser cavity in a direction into the plane of FIG. 2. This configuration produces high power, in excess of 1000 watts. Further, those skilled in the art will note that the present invention includes lasers having a non-gaseous gain medium, such as solid state lasers and semi-conductor lasers.

The gain medium in the auxiliary optical cavity used with the laser 28 is typically a gas, such as a known mixture of carbon dioxide, nitrogen and helium and is also not shown. Those skilled in the art will recognize that other gain media can be equivalently substituted and a variety of electrode configurations can be used depending upon the power output and other desired laser parameters. An auxiliary feedback mirror 60 reflects the auxiliary feedback beam back to the auxiliary optical cavity by way of an auxiliary feedback aperture 62. The output beam of the auxiliary laser then becomes the external feedback beam to the primary laser 28. The present laser configuration embodied by the laser 28 is referred to as the Staged Laser Adjoint Pulser (SLAP) technique.

The auxiliary laser operates on the same frequency as the primary laser 28. This auxiliary laser further comprises an electro-optic or acousto-optic modulator 64 (or chopper) or a modelocking device for modelocked operation should the path lengths of the respective beams be properly chosen. The auxiliary and primary optical cavities do not have to be of equal length. The modulator is now in the adjoint feedback beam of the low power auxiliary laser and now has a much lower incident power. Incident power on the modulator is typically 4–25 W (or 8–50 W two-pass) which is well within damage thresholds of existing devices. Thus, the low power auxiliary laser, designed with a similar threshold levels as the primary laser 28, can be made to modulate, or pulse its output, in turn inducing modulation or pulsation of the primary laser. This technique is the optical analog of staged RF power supply amplification techniques.

To best accomplish primary laser pulsing, either: (1) a power loss mechanism is introduced into the external feedback optical path between the main and auxiliary lasers or (2) the laser is designed so that the auxiliary laser flux is much greater than the "back directed" flux from the primary laser, e.g. through the hole coupler optic, to the auxiliary laser. In other words, the system must be designed so that the simple retroreflection of the "back directed" primary laser power (by a low loss optical path) drives the primary laser well above threshold and it strongly lases continuously.

Figure 3:
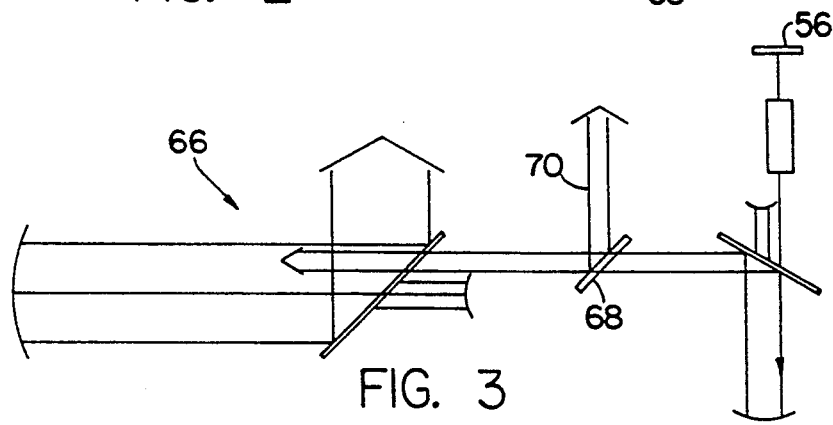
FIG. 3 is a simplified schematic illustration of a first alternative laser to that of FIG. 2.
Figure 4:
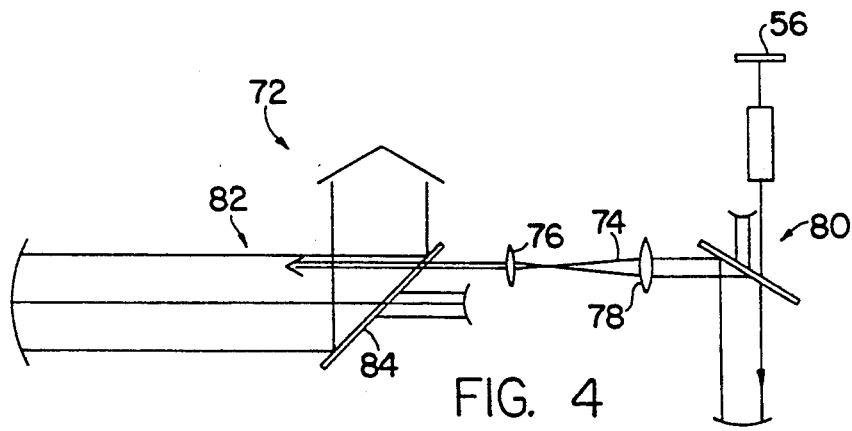
FIG. 4 is a simplified schematic illustration of a second alternative laser to that of FIG. 2.

A power loss mechanism is shown in a laser 66 in FIG. 3. The laser 66 is similar in all respects to the laser 28 of FIG. 2 but further comprises a moderate reflectivity beam splitter 68. The residual power in beam 70 is simply dumped from the laser 66. The auxiliary laser must be designed to deliver sufficient power through the beamsplitter to pulse the primary laser. As shown by laser 72 of FIG. 4, simple demagnification of an output beam 74 of auxiliary laser 80 by means of lenses 76 and 78 can increase the auxiliary laser irradiance (W/cm$^2$) to levels much greater than the primary laser. This small demagnified beam would then be inserted into the primary laser 82 through a small hole coupler optic 84. In other respects, the laser 72 is the same as that of FIG. 2.

Of course, the primary laser 82 may be designed (e.g. too high of magnification) such that the simple retroreflection of the external feedback beam, or primary laser "back directed" power, by the auxiliary laser optical train (without gain and few power losses) is not sufficient to drive the primary laser above threshold. However, the primary laser can then be driven above threshold by the "turning on" the auxiliary laser gain, amplifying the external, adjoint beam (or "back directed"

power) injected back into the primary laser. Thus, pulsed auxiliary laser input into the primary laser is required for the primary laser to go above threshold and itself pulse.

Alternatively another laser provided according to the present invention embodying the SLAP technique configures the auxiliary and primary laser system, as described above, such that the primary laser actually operates barely above threshold (e.g. low power) without the external adjoint feedback injected into the primary laser. Injection of the auxiliary laser output, as external adjoint feedback into the primary laser drives the primary laser further above threshold, greatly increasing power. Thus, primary laser output would consist of a low power continuous wave (CW) output combined with marked, pulsed power increases.

In yet another alternative embodiment, a portion of the output beam can be split from the output beam using a hole coupler or dichroic optic and retroreflecting this portion back into the resonator as an external feedback beam, e.g. phase matched to the resonator mode instead of being adjoint to the resonator mode. Retroreflected beams with other phase profiles can be injected back into the resonator. Modulation of these beams will result in pulsing of the auxiliary laser output, in turn inducing pulsation of the primary laser as described above. As a further alternative, the resonator of the primary and/or auxiliary laser can be of a stable resonator design. The resonator of the primary and/or auxiliary laser can be of unstable or stable ring resonator design. In addition to pulsing the primary laser, the low power modulator stage can be used to control the laser polarization, and to inject a visible or other suitable alignment laser beam into the system for alignment of modulator, internal resonator (primary and auxiliary) and external optic trains.

Figure 5:
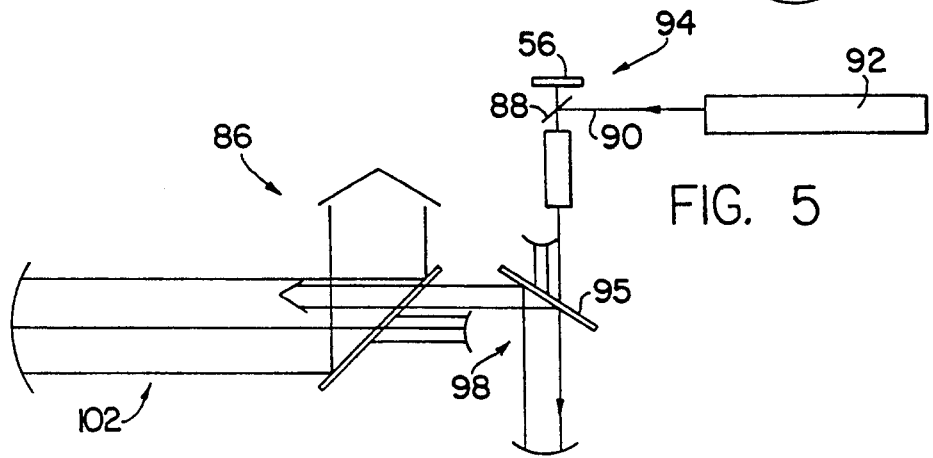
FIG. 5 is a simplified schematic illustration of a laser having an alignment system provided according to the present invention.

A laser alignment system provided according to the present invention is described with respect to FIG. 5. Shown therein is a laser 86 similar to the laser of FIG. 2. The laser 86 further comprises dichroic optics (or hole coupler optics) 88 that inject adjoint beam 90 from and a source 92 into an auxiliary laser 94. The inserted alignment beam is propagated through the modulator optical train and into the auxiliary laser through a hole coupler optic or scraper mirror 95. The axis of the alignment beam walks into the axis of the resonator after many round trips through an auxiliary laser resonator 98 and first demagnifies then expands diffractively until it fills the resonator transversely and is output as a full sized beam with a flat phase. The axis of the alignment beam output from of the auxiliary laser is denoted as a "regurgitated" beam. By adjusting the two resonator end mirrors, the highest intensity portion of the output, the center of the diffractively expanded beam, can be centered on the center obscuration observed in the auxiliary laser output (establishing the optical axis of the resonator). This "regurgitated" alignment beam output from the auxiliary laser, with establishment of the optical axis of the resonator, is denoted as the "auxiliary laser alignment beam".

Figure 6:
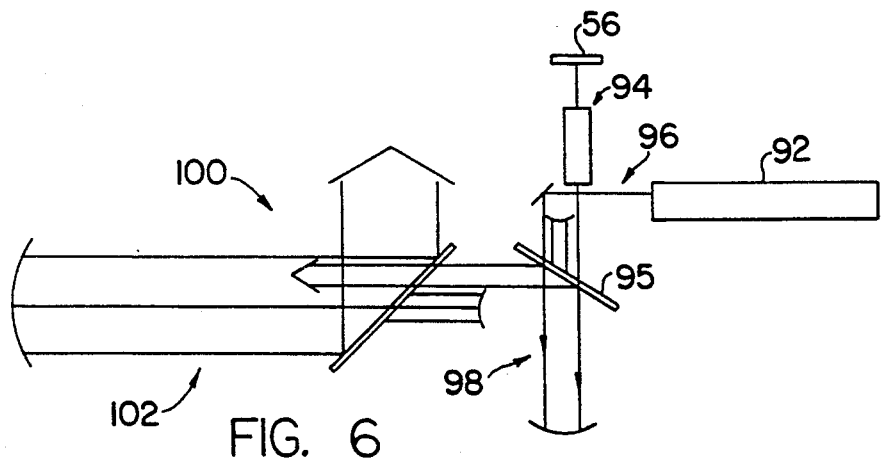
FIG. 6 is a simplified schematic illustration of an alternative alignment system to that of FIG. 5.
Figure 7:
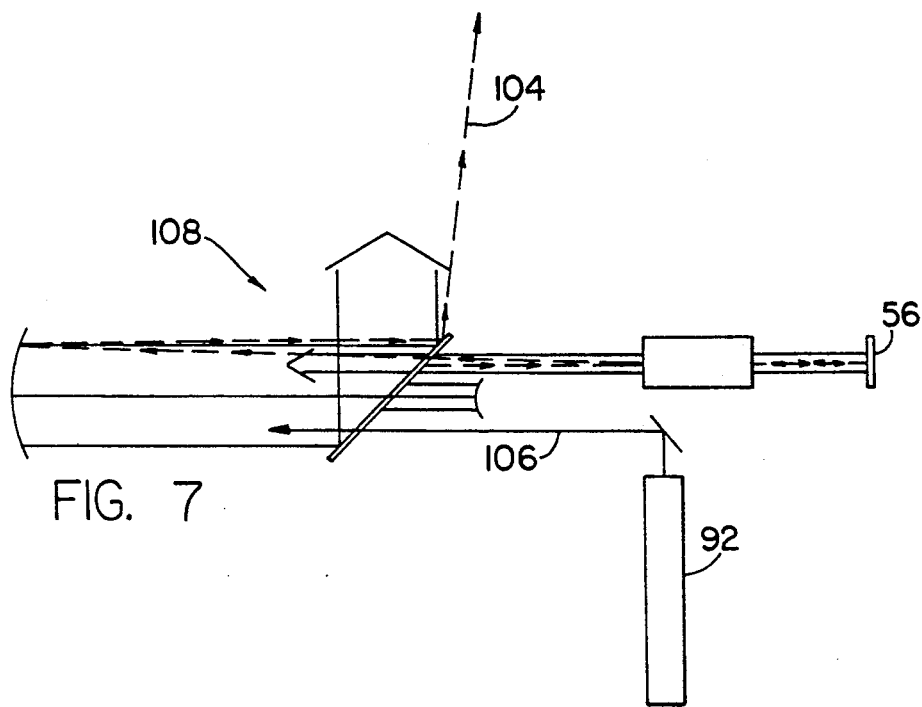
FIG. 7 is a simplified schematic illustration of a second alternative alignment to that of FIG. 5.

A portion of the "regurgitated" alignment beam in FIG. 5 traveling through auxiliary laser resonator 98 is also output back through the scraper mirror into the modulator optical train, and is referred to as the "second" beam. This "second" beam then propagates to a retroreflector 56 in the modulator optical train 102, propages back and is then reinjected back into the auxiliary laser. If this "second beam" is incorrectly aligned, by adjusting the retroreflector, it will make a part of one pass through the auxiliary laser resonator and be output as a observable misaligned beam 104 as shown in FIG. 7. When the "second beam" is adjusted so that it moves into the center obscuration of the output beam, as observed on the laser output, the "second beam" has thus entered the auxiliary laser as an adjoint beam. It is now correctly aligned (establishing the optical axis of the laser's optical train). The "second beam" (optical axis of the laser's optical train) is now coaligned with the "auxiliary laser alignment beam" (optical axis of the auxiliary laser resonator 98). The regurgitated alignment beam output from the auxiliary laser is then injected into the primary laser as an external adjoint beam. The primary laser can then be aligned in an identical manner. Alternatively, an alignment beam 96 may be injected into the auxiliary laser resonator 98, as shown in laser 100 of FIG. 6, or the alignment beam may be injected into an adjoint beam into the high power auxiliary laser optical train, beam 106 of laser 108 in FIG. 7.

The present laser alignment system can be readily extended to include (1) injection of adjoint alignment beams into both primary laser and auxiliary lasers and subsequent coalignment of regurgitated or single resonator round trip beams, (2) multiple alignment beams as described in (1) of different polarizations such as one with S-polarized radiation and the other with P-polarized radiation (standard polarization selective detection techniques would be used) and (3) multiple alignment beams as described in (1) of different wavelengths (standard wavelength selective detection techniques would be used).

Figure 8:
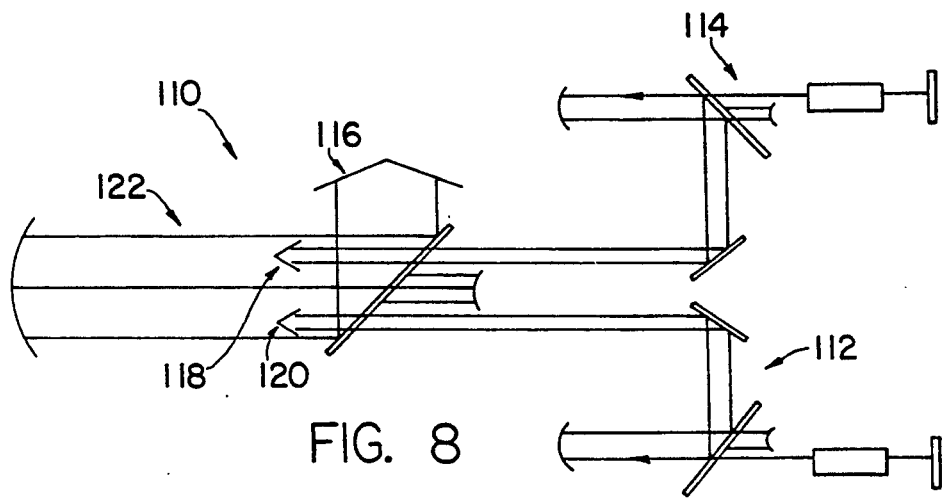
FIG. 8 is a simplified illustration of a laser provided by the present invention having multiple feedback stages.

FIG. 8 illustrates a laser 110 provided according to the present invention having multiple adjoint feedback beams. The laser 110 is a modification of the SLAP laser shown with respect to FIG. 2 and embodies a Multiple Staged Laser Adjoint Pulser (MSLAP) technique provided according to the present invention. The laser 110 is similar in most respects to the laser 28 of FIG. 2 but utilizes multiple auxiliary lasers 112 and 114. With this laser, temporal pulse shaping of the primary laser output beam 116 can be accomplished with choppers, electro-optic or acousto-optic modulators (or modelocking devices as described above) by varying the pulse duration and amplitude of each of the auxiliary lasers whose output beams 118, 120 are then input as external (adjoint) feedback beams into primary laser 122, inducing it to lase with similar pulse characteristics to the sum of the multiple auxiliary laser input beams. More than two auxiliary lasers can be utilized in dependence on the requirements of the application.

Figure 9:
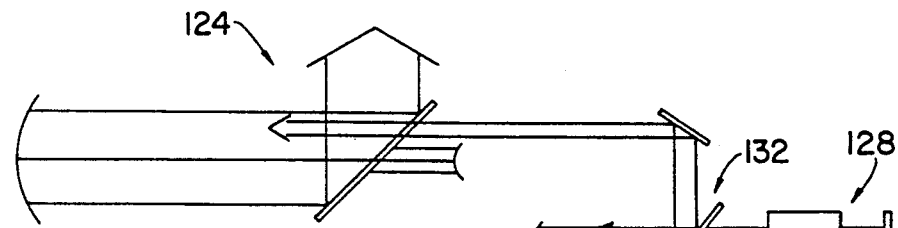
FIG. 9 is a simplified schematic illustration of a first alternative laser to that of FIG. 8.
Figure 10:
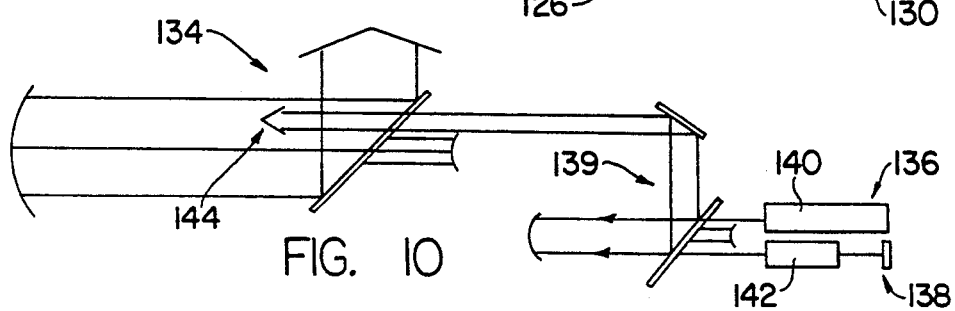
FIG. 10 is a simplified schematic illustration of a second alternative laser to that of FIG. 8.

An alternate MSLAP laser 124 is shown in FIG. 9. In this embodiment, one auxiliary laser 126 is used with one or more modulators 128, 130 to generate the desired external (adjoint) feedback beam 132 shape. Another alternate MSLAP laser 134 is shown in FIG. 10 where external (adjoint) feedback beam 144 is shaped by a feedback beam 139 having a first modulation or pulsing stage 136 that consists of a separate CW or pulsed laser 140, while a second pulsing stage 138 comprises a modulator device 142 as set forth above.

Figure 11:
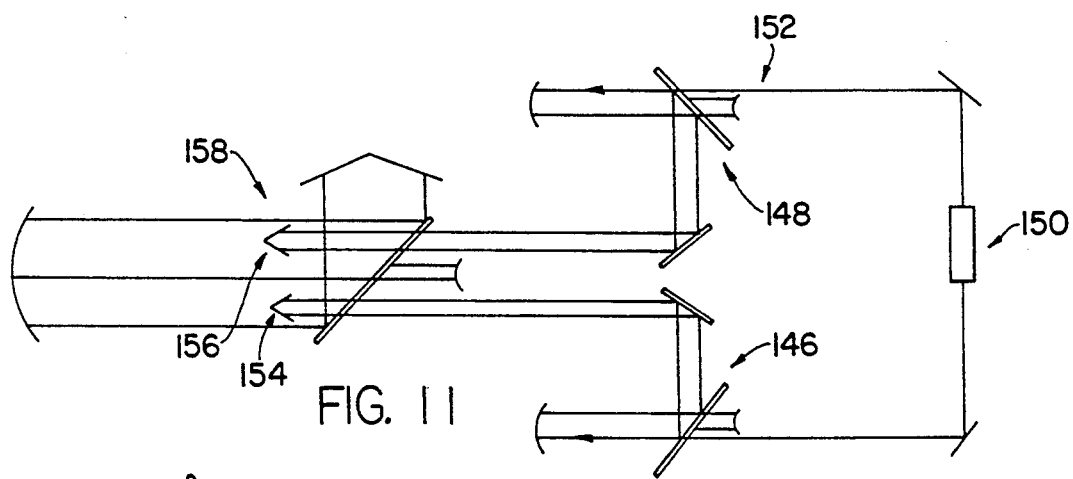
FIG. 11 is a simplified schematic illustration of a third alternative laser to that of FIG. 8.

Still another alternative MSLAP laser 152 is shown in FIG. 11. In this embodiment, two adjoint coupled auxiliary lasers 146 and 148 are used with one modulation stage 150 in the coupling beam optical path. With this embodiment (1) auxiliary laser output beams 154, 156 are frequency matched, providing coherent adjoint beams into primary laser 158, (2) the external (adjoint)

feedback beam power injected into the primary laser can be increased without increasing the incident power on the modulator (two auxiliary lasers can be modulated using one modulation stage) and (3) the number of modulation stages required can be decreased using this configuration. This embodiment can also consist of multiple, or N, coupled auxiliary lasers. As alternative, the output of laser 140 in FIG. 10 can be pulse shaped or power modulated using commercial pulse shaping power supplies if the laser 140 is pulsed or modulation power supplies if operated in a CW mode.

Figure 12:
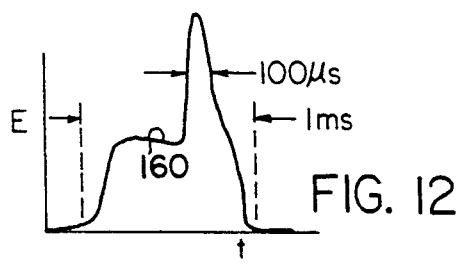
FIG. 12 is a diagrammatic illustration of output beam energy as provided by the laser of FIG. 8.
Figure 13:
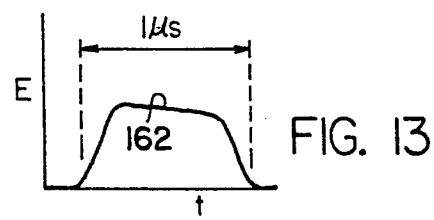
FIG. 13 is a diagrammatic illustration of output beam energy as provided by the laser of FIG. 8 pulsed by a first auxiliary laser.
Figure 14:
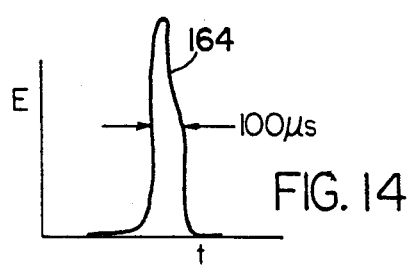
FIG. 14 is a diagrammatic illustration of output beam energy as provided by the laser of FIG. 8 pulsed by a second auxiliary laser.
Figure 15:
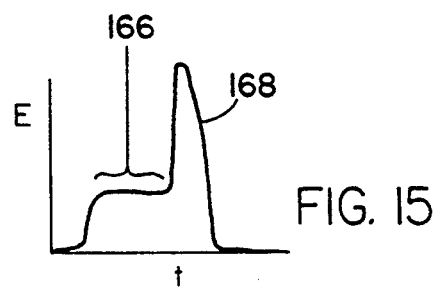
FIG. 15 is a diagrammatic illustration of an output beam of the laser of FIG. 8 as applied to a workpiece.

With the MSLAP technique of the present invention, multiple auxiliary lasers can be used to induce the primary laser to generate shaped pulses, as shown in FIGS. 12-14. Variation of main pulse amplitudes and durations provide a means to vary the characteristics or shapes of pulses delivered to the workpiece of interest. For example, the primary laser pulse can consist of a lower power, long pulse of 1ms (curve 160, FIG. 12), induced by a similar pulse injected from auxiliary laser 1 (curve 162, FIG. 13), combined with a very high power trailing edge, induced by a very high power, short pulse (100 us) injected from auxiliary laser 2, as illustrated in curve 164 in FIG. 14. As seen with respect to FIG. 15, a first portion 166 of this energy pulse can be used to heat a work piece and the peak power trailing edge (curve 168) can be used to machine a hole in a workpiece. Variation of primary laser pulse amplitudes can be accomplished by varying the output amplitudes (powers)/modulation of the auxiliary lasers obtained by different designs of these auxiliary lasers. Variation of the primary laser pulse duration/modulation can be accomplished by varying the auxiliary laser output pulse durations using choppers, electro-optic or acousto-optic modulators.

Figure 16:
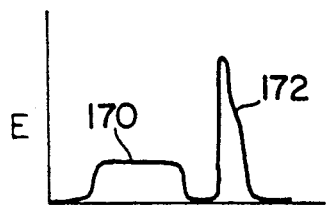
FIG. 16 is a diagrammatic illustration of output beam energy as provided by the laser of FIG. 8 pulsed sequentially by first and second auxiliary lasers.
Figure 17:
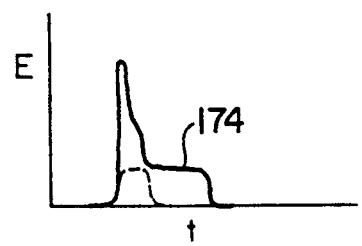
FIG. 17 is a diagrammatic illustration of output beam energy as provided by the laser of FIG. 8 pulsed simultaneously by first and second auxiliary lasers.
Figure 18:
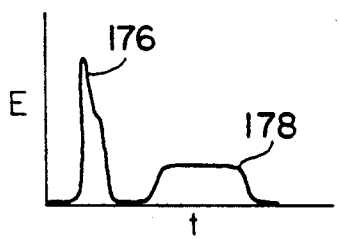
FIG. 18 is a diagrammatic illustration of output beam energy as provided by the laser of FIG. 8 pulsed sequentially by the second auxiliary laser and then the first auxiliary laser.
Figure 19:
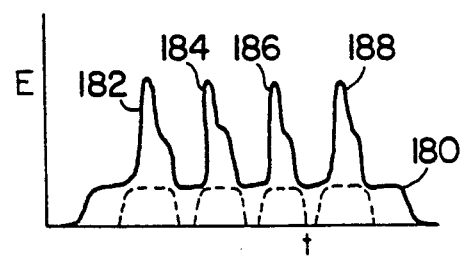
FIG. 19 is a diagrammatic illustration of output beam energy as provided by the laser of FIG. 8 pulsed by the first auxiliary laser and repeatedly by the second auxiliary laser.

With the present invention, multiple auxiliary lasers can be used to induce the primary laser to operate in a variety of ways to generate separate or overlapping pulses of various pulse shapes and amplitudes. Examples of these are shown in the pulsed laser output energy curves of FIGS. 16-19. In FIG. 16, curve 170 is induced by the pulse of a first auxiliary laser followed thereafter without overlap by a subsequent pulse (curve 172) induced by a corresponding pulse of a second auxiliary laser. In FIG. 17, pulses from the auxiliary lasers are triggered simultaneously, yielding a primary laser output pulse as indicated at curve 174. Alternatively, the second auxiliary laser can be triggered first, yielding the primary laser output beam pulses 176 and 178 of FIG. 18. In FIG. 19, the first auxiliary laser may be pulsed to generate a broad primary laser pulse (curve 180), while the second laser can be repetitively pulsed (curves 182-188). In addition, the MSLAP configuration can be used to vary the laser polarization pulse to pulse with each modulation stage designed to offer either linear, elliptical or circular polarization.

The present invention can be utilized with individual lasers having separate gain generators as detailed above, or with main and auxiliary lasers using the same gain generator. In general, the application of novel laser techniques to industrial applications such as assembly line fabrication and machining are difficult due to complexity and reliability problems. Optical systems with complicated and numerous subsystems, particularly laser systems with multiple gain generators, power supplies, electronic controls, etc. present the fabrication and machining production manager with increased risk for reliable operation.

Figure 21:
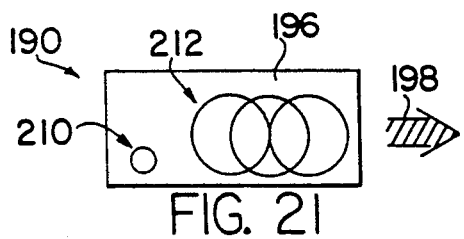
FIG. 21 is an end view of the laser of FIG. 20.

For applications that require low complexity and high reliablity, a laser provided according to the present invention utilizes portions of a primary laser gain generator as the gain generator(s) for single or multiple auxiliary lasers needed to implement the SLAP and MSLAP techniques on high power lasers. This is accomplished by utilizing an unused portion of the available gain region to provide gain for the auxiliary laser, as shown with the respect to the lasers of FIGS. 20-23. Laser 190 is comprised of a single optical cavity 194 having a single gaseous gain medium 196, preferably a convective flow type laser as detailed above in which the gas is flowed across the optical cavity at 198. The laser 190 is substantially the same as the laser of FIG. 2, except that the auxiliary laser shares the same optical cavity and gain medium, and therefore requires certain modification as shown to allow for the same. Scraper mirror 200 is used by the auxiliary laser, while scraper mirror 202 comprises part of the primary laser and includes an aperture for presenting adjoint feedback beam 204 received from turning mirror 206 to mirror 208. The auxiliary laser beam is shown schematically at 210 in FIG. 21 (transverse in the gain medium), while the path of the primary laser beam through the gain medium is shown at 212.

Figure 23:
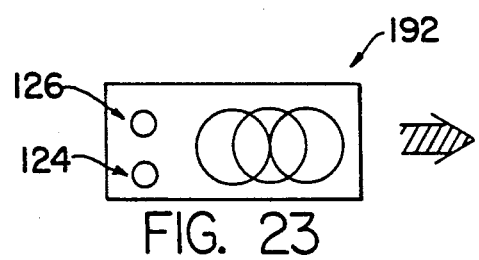
FIG. 23 is an end view of the laser of FIG. 22.
Figure 20:
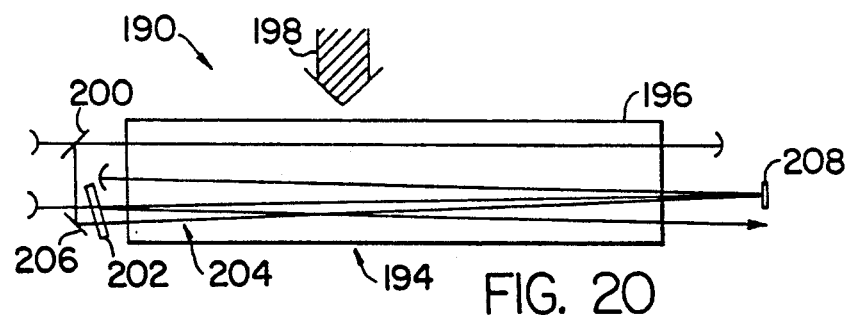
FIG. 20 is a top view of a laser provided by the present invention wherein an auxiliary laser shares a common gain medium with a primary laser.
Figure 22:
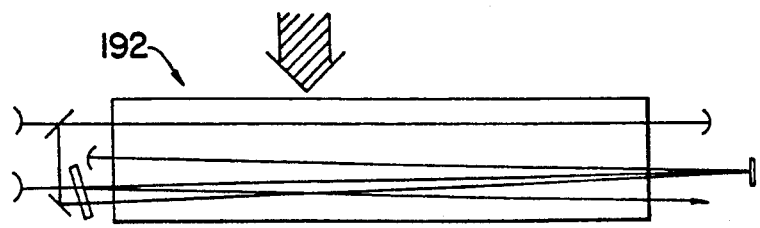
FIG. 22 is a top view of a laser provided by the present invention wherein two auxiliary lasers share a common gain medium with a primary laser.

For two auxiliary lasers, another portion of the main gain region can be used, as shown in FIGS. 22, 23. The laser 192 is substantially the same as laser 190 but has a second auxiliary laser shown schematically at 124 stacked beneath a first auxiliary laser 126. Alteratively for lasers with no unused portion of the gain region, either the optical path can be redesigned to make gain available for the auxiliary laser(s) or the auxiliary lasers can use the same gain medium as the primary gain medium, taking care not to have laser cross-talk.

Several advantages exist for this utilization of the primary laser gain medium to supply gain for the auxiliary lasers. The auxiliary lasers have emission frequencies very close, if not identical to, those supported by the primary laser without any need for temperature control or wavelength control (such as gratings and other devices). It is possible to retrofit existing large transverse cross-section high power lasers (i.e. UTIL's line of high power $CO_2$ industrial lasers) with a resonator assembly provided by the present invention. The present laser has a significantly reduced cost associated with it as compared to known multilaser systems, since separate commercial auxiliary $CO_2$ lasers or the fabrication of separate $CO_2$ gain generators, power supplies, electronic controls etc. are not required. The present invention provides greatly reduced complexity, since elimination of separate auxiliary gain generators, electronic controls, power supplies etc. increases reliability, decreases maintenance and reduces cost.

Similarly, although the invention has been shown and described with respect to a preferred embodiment thereof, it should be understood by those skilled in the art that various other changes, omissions and additions thereto may be made therein without departing from the spirit and scope of the present invention.

We claim:
1. A laser, comprising:
   a primary optical cavity disposed along an optic axis having therein a primary optical beam composed of at least one longitudinal mode each with a mode phase, said optical cavity further having optical losses;

a primary excitation means for communicating excitation signals to said optical cavity;

a primary gain medium located in said optical cavity for receiving said excitation signals and for providing optical gain to said optical beam such that said primary laser longitudinal mode exceeds lasing threshold;

a primary resonator assembly positioned within said primary optical cavity including a primary cavity first mirror positioned at a first end of the optical cavity;

a primary scraper mirror positioned within said primary optical cavity to receive said primary optical beam transiting therein and to turn a portion of said primary optical beam outward from said primary optical cavity as an output beam, said primary scraper mirror having a central aperture along said optic axis and a feedback aperture displaced from said optic axis about a primary feedback axis;

a primary cavity second mirror opposed to said primary cavity first mirror at a second end of the primary optical cavity along said primary optic axis registered with said central aperture configured to reflect said primary optical beam within said primary optical cavity; and an auxiliary laser for providing along said primary feedback axis an adjoint feedback beam to said primary optical cavity, said auxiliary laser including an auxiliary optical cavity disposed along an auxiliary optic axis having therein an auxiliary optical beam having the same frequency as said primary optical beam and being composed of at least one longitudinal mode with a mode phase, said auxiliary optical cavity further having optical losses;

an auxiliary excitation means for communicating excitation signals to said auxiliary optical cavity;

a gain medium located in said auxiliary optical cavity for receiving said excitation signals and for providing optical gain to said auxiliary optical beam such that said auxiliary laser longitudinal mode exceeds lasing threshold;

an auxiliary resonator assembly positioned within said auxiliary optical cavity including an auxiliary cavity first mirror positioned at a first end of the auxiliary optical cavity;

an auxiliary scraper mirror positioned within said auxiliary optical cavity to receive said auxiliary optical beam transiting therein and to turn a portion of said auxiliary optical beam outward from said auxiliary optical cavity along said primary feedback axis as said adjoint feedback beam, said auxiliary scraper mirror having a central aperture along said auxiliary optic axis and a feedback aperture displaced from said auxiliary optic axis about an auxiliary feedback axis;

an auxiliary cavity second mirror opposed to said first auxiliary cavity first mirror at a second end of the auxiliary optical cavity along said auxiliary optic axis registered with said central aperture configured to reflect said auxiliary optical beam within said auxiliary optical cavity a feedback mirror located along said auxiliary feedback axis for reflecting a feedback beam transiting in said auxiliary optical cavity; and a pulsing means positioned along said auxiliary feedback axis to receive said auxiliary feedback beam and, in response to control signals, provide thereto a perturbation in optical loss incurred by said auxiliary feedback beam transiting said auxiliary optical cavity, thereby generating a pulsed output beam from said laser.

2. The laser of claim 1 wherein said first primary cavity mirror has a focus located along said primary optic axis inside said primary optical cavity and wherein said second primary cavity mirror has a focus substantially at said first primary cavity mirror focus; said first and second primary cavity mirrors configured to invert said primary optical beam transiting therebetween.

3. The laser of claim 1 wherein said first primary cavity mirror has a focus located along said primary optic axis outside of said primary optical cavity.

4. The laser of claim 1 wherein said primary gain medium is a gas comprised of one or more of the gases from the group consisting essentially of carbon dioxide, nitrogen and helium.

5. The laser of claim 1 wherein said gain medium comprises a gas.

6. The laser of claim 5 wherein said laser is of the transverse electrode, convective flow type.

7. The laser of claim 6 wherein a cathode electrode further comprises a series of "L" shaped elements extending into said gas.

8. The laser of claim 6 wherein said gas is flowed between electrodes at a velocity of approximately Mach 0.3.

9. The laser of claim 1 wherein said pulsing means further comprises a modelocking device.

10. The laser of claim 1 wherein said pulsing means comprises a modulator.

11. The laser of claim 9 wherein said modulator further comprises a cavity "Q" switching device.

12. The laser of claim 8 wherein said modulator comprises a chopper.

13. The laser of claim 1 wherein said gain medium comprises a solid medium.

14. The laser of claim 1 wherein said primary scraper mirror further comprises a second feedback aperture displaced from said optic axis about a second primary feedback axis, and wherein said laser further comprises a second auxiliary laser for providing along said second primary feedback axis a second adjoint feedback beam to said primary optical cavity, said second auxiliary laser including a second auxiliary optical cavity disposed along a second auxiliary optic axis having therein a second auxiliary optical beam having the same frequency as said primary optical beam and being composed of at least one longitudinal mode with a mode phase, said a second auxiliary optical cavity further having optical losses;

a second auxiliary excitation means for communicating excitation signals to said second auxiliary optical cavity;

a gain medium located in said auxiliary optical cavity for receiving said excitation signals and for providing optical gain to said second auxiliary optical beam;

a second auxiliary resonator assembly positioned within said second auxiliary optical cavity including a cavity first mirror positioned at a first end of the optical cavity;

a scraper mirror positioned within said second auxiliary optical cavity to receive said auxiliary optical beam transiting therein and to turn a portion of said auxiliary optical beam outward from said auxiliary optical cavity along said primary feedback axis as said adjoint feedback beam, said scraper mirror having a central aperture along said second auxiliary optic axis and a feedback aperture displaced from said second auxiliary optic axis about a second auxiliary feedback axis;

a cavity second mirror opposed to said cavity first mirror at a second end of the second auxiliary optical cavity along said second auxiliary optic axis registered with said central aperture configured to reflect said second auxiliary optical beam within said second auxiliary optical cavity;

a second feedback mirror located along said second auxiliary feedback axis for reflecting a second feedback beam transiting in said second auxiliary optical cavity; and a second pulsing means positioned along said second auxiliary feedback axis to receive said second auxiliary feedback beam and, in response to control signals, provide thereto a perturbation in optical loss incurred by said second auxiliary feedback beam transiting said auxiliary optical cavity, thereby generating a pulsed output beam from said laser.

15. The laser of claim 1 further comprising:
a second feedback aperture in said auxiliary scraper mirror disposed about a second auxiliary feedback axis;
a second feedback mirror located at a distal end thereof for reflecting a second feedback beam transiting in said auxiliary optical cavity; and
a second pulsing means positioned along said second auxiliary feedback axis to receive said second auxiliary feedback beam and, in response to control signals, provide thereto a perturbation in optical loss incurred by said second auxiliary feedback beam transiting said auxiliary optical cavity, thereby generating a pulsed output beam from said laser.

16. The laser of claim 1 wherein said primary excitation signals are of a magnitude to excite said primary gain medium to just beneath lasing threshold and wherein said auxiliary excitation signals are of a magnitude to excite said auxiliary gain medium above lasing threshold.

17. The laser of claim 1 wherein said primary and auxiliary gain media are configured to have substantially the same lasing threshold.

18. The laser of claim 1 further comprising an optical power loss apparatus configured along said primary feedback axis to provide, in response to control signals, optical power loss to said adjoint feedback beam.

19. The laser of claim 1 wherein said adjoint feedback beam flux is larger in magnitude than flux presented from said primary optical cavity along said primary feedback axis.

20. The laser of claim 1 wherein said primary excitation signals are of a magnitude to excite said primary gain medium to just above lasing threshold and wherein said auxiliary excitation signals are of a magnitude to excite said auxiliary gain medium above lasing threshold.

21. The laser of claim 1 further comprising a beam splitting means for splitting a portion from said primary beam and retroreflecting said split beam portion into said primary resonator as a mode matched feedback beam.

22. The laser of claim 1 wherein said resonator assembly is configured to be of a stable configuration.

23. The laser of claim 1 further comprising a beam alignment means including a means for generating an alignment beam and beam injection means configured to inject said alignment beam into said auxiliary laser feedback beam, said beam alignment means further comprising a means for adjusting said auxiliary cavity first and second mirrors to center a highest intensity portion of said auxiliary output beam on a center obscuration in said auxiliary laser output beam, thereby establishing said optic axis of said primary resonator cavity.

24. The laser of claim 1 further comprising a beam alignment means including a means for generating an alignment beam and beam injection means configured to inject said alignment beam into said auxiliary optical cavity through an alignment aperture in said auxiliary scraper mirror, said beam alignment means further comprising a means configured for adjusting said auxiliary cavity first and second mirrors to center a highest intensity portion of said auxiliary output beam on a center obscuration in said auxiliary laser output beam, thereby establishing alignment of said auxiliary resonator assembly with said primary laser assembly.

25. A laser, comprising:
a optical cavity disposed along an optic axis having therein a primary optical beam composed of a longitudinal mode with a mode phase, said optical cavity further having optical losses;
a excitation means for communicating excitation signals to said optical cavity;
a gain medium located in said optical cavity for receiving said excitation signals and for providing optical gain to primary and adjoint feedback optical beams such that longitudinal modes associated therewith exceed lasing threshold;
a primary resonator assembly positioned within said optical cavity including
a primary resonator first mirror positioned at a first end of the optical cavity;
a primary scraper mirror positioned within said optical cavity to receive said primary optical beam transiting therein and to turn a portion of said primary optical beam outward from said optical cavity as an output beam, said primary scraper mirror having a central aperture and a feedback aperture displaced therefrom;
a primary resonator second mirror opposed to said primary resonator first mirror at a second end of the optical cavity configured to reflect said primary optical beam within said optical cavity; and
an auxiliary laser for generating said adjoint feedback beam having the same frequency as said primary optical beam,
an auxiliary resonator assembly positioned within said optical cavity including
an auxiliary first mirror positioned at a first end of the optical cavity;
an auxiliary scraper mirror positioned within said optical cavity to receive said adjoint feedback optical beam transiting therein and to turn a portion of said auxiliary optical beam outward from said auxiliary optical cavity as said adjoint feedback beam, said auxiliary scraper mirror having a central aperture and a feedback aperture displaced therefrom;
an auxiliary second mirror opposed to said auxiliary first mirror configured to reflect said auxiliary optical beam within said optical cavity;

a feedback mirror for reflecting said adjoint feedback beam transiting in said auxiliary optical cavity; and a pulsing means positioned to receive said adjoint feedback beam and, in response to control signals, provide thereto a perturbation in optical loss incurred thereby transiting said optical cavity, thereby generating a pulsed output beam from said laser.

26. The laser of claim 25 wherein said first primary mirror has a focus located along a primary optic axis inside said optical cavity and wherein said second primary mirror has a focus substantially at said first primary mirror focus; said first and second primary mirrors configured to invert said primary optical beam transiting therebetween.

27. The laser of claim 25 wherein said first primary mirror has a focus located along a primary optic axis outside of said primary optical cavity and wherein said second primary mirror has a focus substantially at said first primary mirror focus.

28. The laser of claim 25 wherein said gain medium is a gas comprised of one or more of the gases from the group consisting essentially of carbon dioxide, nitrogen and helium.

29. The laser of claim 25 wherein said gain medium comprises a gas.

30. The laser of claim 29 wherein said laser is of the transverse electrode, convective flow type.

31. The laser of claim 29 wherein a cathode electrode further comprises a series of "L" shaped elements extending into said gas.

32. The laser of claim 29 wherein said gas is flowed between electrodes at a velocity of approximately Mach 0.3.

33. The laser of claim 25 wherein said pulsing means further comprises a modelocking device.

34. The laser of claim 25 wherein said pulsing means comprises a modulator.

35. The laser of claim 34 wherein said modulator further comprises a cavity "Q" switching device.

36. The laser of claim 34 wherein said modulator comprises a chopper.

37. The laser of claim 25 wherein said output beam is configured to comprise only selected ones of longitudinal modes operating above a lasing threshold.

38. The laser of claim 1 further comprising a means for establishing that a beam flux of a back directed beam directed toward said auxiliary laser from said primary resonator is less in magnitude than the flux magnitude of said adjoint feedback beam.

39. The laser of claim 1 further comprising a beam splitting means for dumping from the laser a portion of a back directed beam from said primary resonator along said from said primary feedback axis.

40. The laser of claim 1 further comprising a means for demagnifying said adjoint feedback beam as it is presented to said primary resonator thereby increasing the adjoint feedback beam irradiance to a level greater than that of said primary cavity beam.

41. The laser of claim 1 wherein said pulsing means comprises a means for modulating polarization of said output beam.

42. A laser resonator assembly for use with a laser having an optical cavity disposed along an optic axis having therein a primary optical beam, an excitation means for communicating excitation signals to said optical cavity, a gain medium located in said optical cavity for receiving said excitation signals and for providing optical gain to said primary optical beam and an adjoint feedback optical beam having the same frequency as said primary optical beam generated by an auxiliary laser such that optical modes respectively associated therewith exceed lasing threshold, and a pulsing means positioned to receive said adjoint feedback beam and, in response to control signals, provide thereto a perturbation in optical loss incurred thereby in transiting said optical cavity, thereby generating a pulsed output beam from said laser, said laser resonator assembly comprising:

a primary resonator assembly positioned within said optical cavity including a primary resonator first mirror positioned at a first end of the optical cavity;

a primary scraper mirror positioned within said optical cavity to receive said primary optical beam transiting therein and to turn a portion of said primary optical beam outward from said optical cavity as an output beam, said primary scraper mirror having a central aperture and a feedback aperture displaced therefrom;

a primary resonator second mirror opposed to said primary resonator first mirror at a second end of the optical cavity configured to reflect said primary optical beam within said optical cavity; and an auxiliary resonator assembly positioned within said optical cavity including an auxiliary first mirror positioned at a first end of the optical cavity;

an auxiliary scraper mirror positioned within said optical cavity to receive said adjoint feedback optical beam transiting therein and to turn a portion of said auxiliary optical beam outward from said auxiliary optical cavity as said adjoint feedback beam, said auxiliary scraper mirror having a central aperture and a feedback aperture displaced therefrom;

an auxiliary second mirror opposed to said auxiliary first mirror configured to reflect said auxiliary optical beam within said optical cavity;

a feedback mirror for reflecting said adjoint feedback beam transiting in said auxiliary optical cavity.

43. The laser of claim 15 wherein said second pulsing means comprises a second auxiliary laser.

44. The laser of claim 1 wherein said gain medium comprises a semiconductor medium.

45. The laser of claim 1 wherein said primary resonator assembly comprises a ring resonator.

46. The laser of claim 1 wherein said auxiliary laser further comprises a frequency selecting means for adjusting the frequency of said auxiliary laser.

47. The beam alignment means of claim 23 further comprises a means for adjusting said primary cavity first and second mirrors to center a highest intensity portion of said primary output beam on center obscuration in said primary laser output beam, thereby establishing said primary resonator cavity optic axis.

48. The alignment means of claim 23 further comprising a means for injecting alignment beams of different polarizations into said auxiliary optical resonators.

49. The alignment means of claim 23 further comprising a means of injecting alignment beams of different wavelengths into said primary and auxiliary optical resonators.

50. The laser of claim 41 wherein said auxiliary laser further comprises a polarization selecting apparatus configured to transmit said auxiliary laser feedback optical beam.

51. The laser of claim 23 further comprising a means for injecting said alignment beam into said primary optical cavity to establish said optic axis of said primary resonator cavity.

52. The laser of claim 1 wherein said output beam is configured to comprise only selected ones of longitudinal modes operating above a lasing threshold.

53. The laser of claim 1 wherein said auxiliary laser includes a means for selecting the frequency of said auxiliary laser beam.

* * * * *

UNITED STATES PATENT AND TRADEMARK OFFICE
CERTIFICATE OF CORRECTION

PATENT NO. : 5,173,918
DATED : Dec. 22, 1992
INVENTOR(S) : Sallie Townsend, Philip Cunningham and John Foley It is certified that error appears in the above-indentified patent and that said Letters Patent is hereby corrected as shown below:

On the title page,

Abstract:

Line 10, please delete "laser" and insert --lasers--.

Column 2:

Line 4, after the word "characterized" please delete "b' and insert --by--.

Signed and Sealed this

Seventh Day of December, 1993

Attest:

BRUCE LEHMAN

Attesting Officer      Commissioner of Patents and Trademarks